(12) United States Patent
Humblet

(10) Patent No.: US 8,938,031 B2
(45) Date of Patent: Jan. 20, 2015

(54) PHASE SLIP REDUCTION METHOD

(75) Inventor: Pierre Humblet, Cambridge, MA (US)

(73) Assignee: Acacia Communications Inc., Maynard, MA (US)

( * ) Notice: Subject to any disclaimer, the term of this patent is extended or adjusted under 35 U.S.C. 154(b) by 0 days.

(21) Appl. No.: 13/608,790

(22) Filed: Sep. 10, 2012

(65) Prior Publication Data

US 2013/0064329 A1    Mar. 14, 2013

Related U.S. Application Data

(60) Provisional application No. 61/532,231, filed on Sep. 8, 2011.

(51) Int. Cl.
*H04L 27/06* (2006.01)
*H04B 10/67* (2013.01)
*H04L 27/22* (2006.01)
*H04L 27/227* (2006.01)

(52) U.S. Cl.
CPC ............ *H04B 10/676* (2013.01); *H04L 27/223* (2013.01); *H04L 27/227* (2013.01)
USPC ........... 375/340; 375/261; 375/265; 375/330; 375/341; 375/365

(58) Field of Classification Search
CPC .... H04L 10/676; H04L 27/223; H04L 27/227
USPC ......... 375/340, 261, 265, 330, 343, 341, 365; 714/792, 795
See application file for complete search history.

(56) References Cited

U.S. PATENT DOCUMENTS

| | | | |
|---|---|---|---|
| 6,477,208 B1 * | 11/2002 | Huff | 375/265 |
| 7,900,184 B2 * | 3/2011 | Potkonjak et al. | 716/136 |
| 2012/0128377 A1 * | 5/2012 | Hatae et al. | 398/208 |

OTHER PUBLICATIONS

Gianluigi Ferrari, "Noncoherent iterative decoding of spectrally efficient coded modulations" pp. 409-421, Ann. telecommunication, 2001.*

* cited by examiner

*Primary Examiner* — Dhaval Patel
(74) *Attorney, Agent, or Firm* — Jeffery J. Brosemer

(57) ABSTRACT

Disclosed herein are methods and techniques for reducing phase slips in optical communications systems and in particular methods and techniques that operate in receivers for a coherent communication system transmitting modulated data symbols exhibiting N-ary symmetrical constellation and predetermined reference symbols.

12 Claims, 3 Drawing Sheets

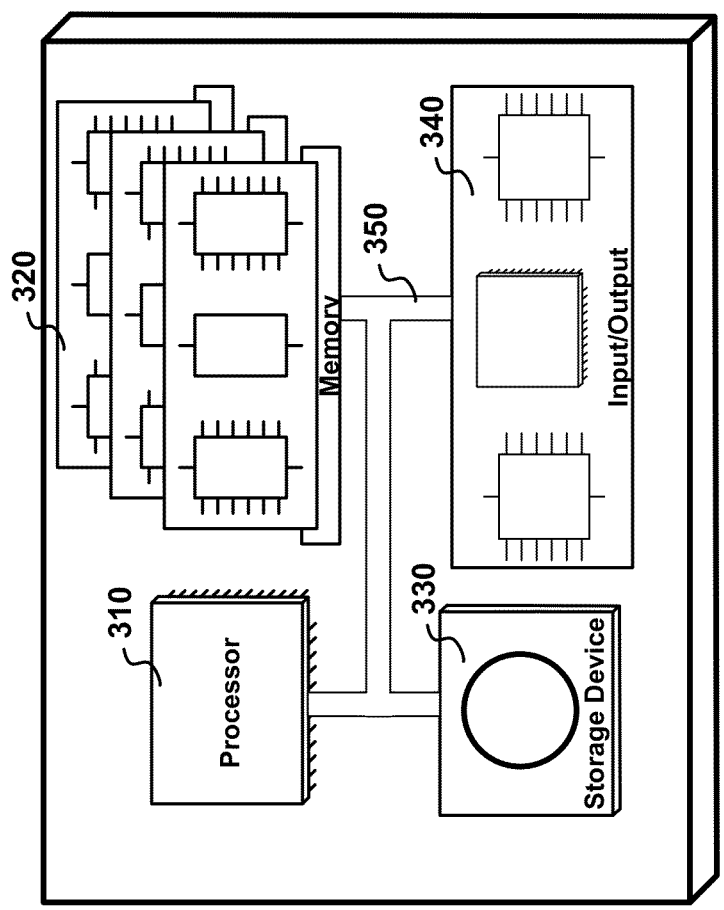

PHASE SLIP REDUCTION METHOD

CROSS REFERENCE TO RELATED APPLICATION

This application claims the benefit of U.S. Provisional Patent Application Ser. No. 61/532,231 filed Sep. 8, 2011 which is incorporated by reference in its entirety as if set forth at length herein.

TECHNICAL FIELD

This disclosure relates generally to the field of telecommunications and in particular to a method and implementation for the reduction of phase-slips in optical communication systems.

BACKGROUND

Contemporary optical communications systems oftentimes employ phase estimation techniques in their receivers. One aspect of these techniques however, is an undesirable "phase slip"—an occurrence of a large and persistent phase estimation error.

Accordingly methods that reduce such phase slips would represent a welcome addition to the art.

SUMMARY

An advance in the art is made according to an aspect of the present disclosure directed to methods and techniques for reducing phase slips in optical communications systems.

Viewed from a first aspect, the present disclosure is directed to a phase slip reduction methods which may operate in receivers for a coherent communication system transmitting modulated data symbols exhibiting N-ary symmetrical constellation and predetermined reference symbols comprising the steps: a) Obtaining a phase estimate modulo $2\pi/N$ at the times of reception of reference symbols; b) Forming a trellis with nodes and branches between adjacent nodes where the nodes at one time of said times are labeled by said estimate at that time plus distinct multiples modulo $2\pi$ of $2\pi/N$; c) Assigning to the nodes at said time weights dependent on the difference modulo $2\pi$ between said nodes labels and the received reference symbol angle at said time; d) Assigning to each branch a length dependent on the difference modulo $2\pi$ between the labels of the branch end nodes; e) Determining a decision path that is a shortest path traversing the trellis, where the length of a path is the sum of the branch lengths and node weights on said path; and f) For each received data symbol, determining a demodulation angle by interpolating between the node labels on the decision path.

BRIEF DESCRIPTION OF THE DRAWING

A more complete understanding of the present disclosure may be realized by reference to the accompanying drawings in which:

FIG. 3 is a block diagram showing a representative computer system which may provide operation of a system employing a method according to the present disclosure.

DETAILED DESCRIPTION

Figure 1:
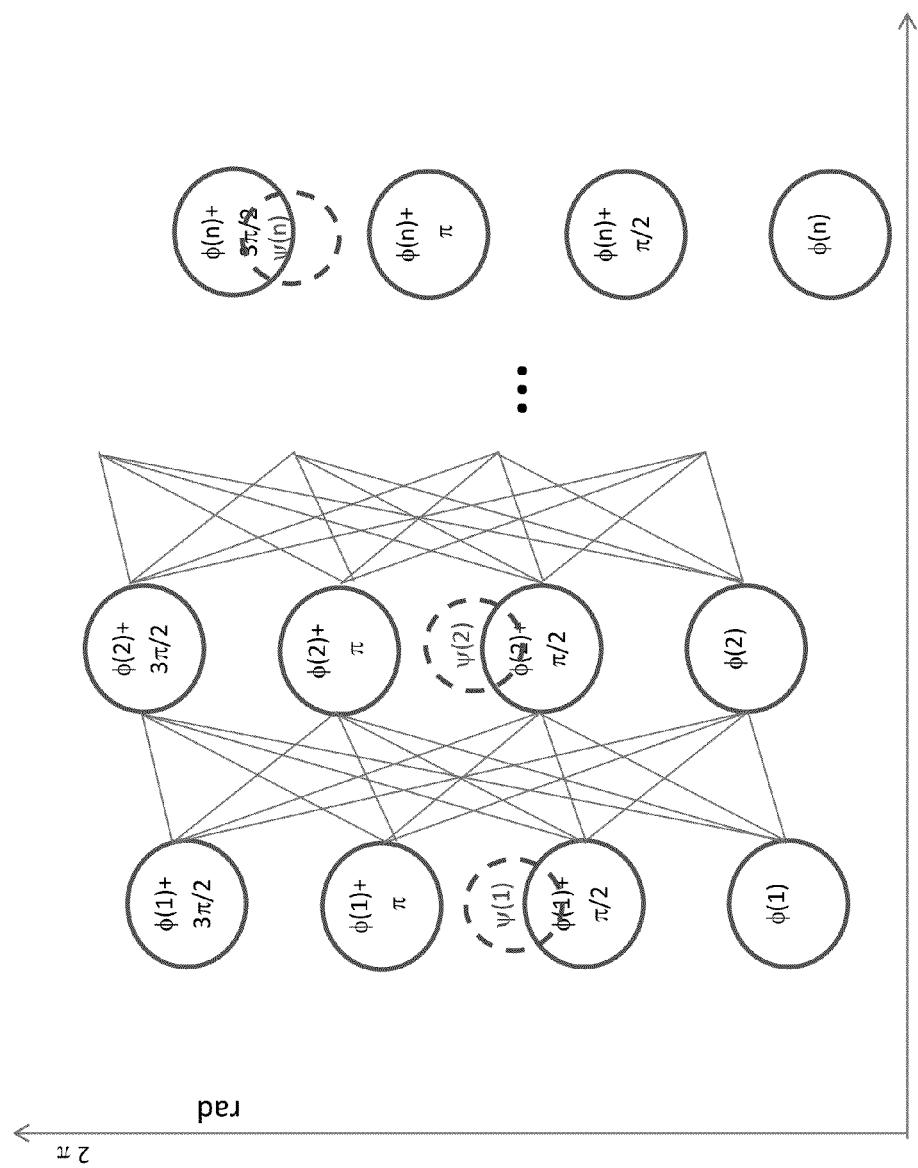
FIG. 1 shows an exemplary trellis diagram for QPSK according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we note that generally, signal phase noise is oftentimes an issue in contemporary optical communication systems since solid state lasers employed in such systems may exhibit phase noise that can be orders of magnitude more significant than in radio and other communications technologies and also because the reliability requirements of such optical communications systems—such as bit error rates not exceeding 1.e−15—are much more strict.

Consequently, a number of proposed solutions to this issue have appeared in the art. For example, lasers that exhibit less phase noise may be employed, but unfortunately such lasers may be substantially more expensive or physically unsuitable due to their size and/or mass. Alternatively, modulation methods that are phase noise resistant such as on-off keying or frequency shift keying may be employed. Finally, demodulation methods—such as differential detection—that are insensitive to phase noise when used with differential encoding may be employed. However these methods typically require a larger signal to noise ratio (SNR) than coherent demodulation.

In an effort to lower the SNR requirements for optical communications systems, still more recent optical systems have come to rely on modulation techniques using differential encoding and coherent demodulation. As noted, such techniques encode information in phase changes and a receiver attempts to estimate the signal phase—relying on the fact that the phase noise is sufficiently small to allow phase estimation over a number of adjacent symbols. Advantageously with such methods, the receiver need not need derive an absolute phase reference since the received signal can be demodulated by observing the phase shifts. Notably, there is a significant power penalty with such methods since errors tend to occur in pairs, which leads to doubling the bit error rate for a given signal to noise ratio.

As those skilled in the art will readily appreciate, systems and methods employing phase estimation techniques that estimate phase from modulated symbols is often based on a method described in a well-known paper by A. Viterbi and A. Viterbi that is incorporated by reference herein as if set forth at length, (See, e.g., A.Viterbi, and A.Viterbi, IEEE Transactions on Information Theory, Vol. IT-29, No. 4, July 1983, pp. 543-551) in which phase estimation takes place independently of data demodulation (thus belonging to the class of Non Data Aided methods). This method exhibits a peculiarity in that the estimate of the phase is only given modulo $2\pi/N$, where N is the degree of symmetry of the signal constellation (for example, N=2 for binary phase shift keying (BPSK) and N=4 for quadrature phase shift keying (QPSK)). The same sector ambiguity arises with simple decision feedback, where the phase is measured modulo $2\pi/N$ from the center of the sector where the received signal lies. And while it is well known in the art that these methods are not optimal—for example, it would be better to jointly estimate the phase and demodulate the data—however doing so is prohibitively complex and therefore not currently feasible in very high data rate systems.

With the class of phase estimation techniques noted above, the estimated phase is observed to remain near the center of a given sector of the complex circle (quadrant in the case N=4) for relatively long periods of time, and then to transition quickly to near the center of a neighboring sector. The jump is called a "phase slip", and the existence of such phase slips prevents the use of normal (not differentially encoded) coherent modulation. In order to resolve the modulo $2\pi/N$ uncertainty one needs to break the symmetry of the signal constellation. This can be done for example by inserting predetermined reference symbols (also called pilot symbols) at predetermined times, where the receiver is aware of the reference symbol pattern and can synchronize to them. Of course phase changes can still occur between reference symbols, and it is not obvious how to detect them quickly, as the reference symbols themselves are also corrupted by noise. To ease the phase slip detection and reduce the phase slip lengths one can increase the reference symbols density, but this requires power and bandwidth, which is undesirable.

As those skilled in the art can now surely appreciate, a method that improves current phase estimation methods with inherent modulo $2\pi/N$ uncertainty in order to obtain the correct absolute phase, reduces the occurrence of phase slips (i.e. events where the phase estimation error is large), and quickly recovers the correct phase when a slip has occurred—while not requiring too high a reference symbol density—would represent a significant advance in the art. Such a method is one aspect of this disclosure.

For our purposes of discussion herein, we assume that known reference symbols are transmitted periodically and that those symbols are received with a unit mean amplitude (this can be insured by scaling) in presence of additive white complex Gaussian noise with variance $\sigma^2$ for both the real and imaginary components. The receiver rotates the received complex value of a reference symbol by a predetermined reference phase pattern thereby cancelling the modulation of the reference symbol, thus producing a complex number $\Psi$, with real and imaginary components $\Psi_r$ and $\Psi_i$ and an angle (also called "argument") $\psi$.

In absence of phase noise the mean of $\Psi$ is 1. The overall phase noise (including both the transmitter oscillator (laser) and the local receiver oscillator (laser)) is modeled as a Wiener process $\theta$ (also known as one dimensional Brownian motion) that has phase changes $\Delta$ over intervals between successive reference symbols. The mean of $\Delta$ is 0 and $\mu^2$ denotes its variance. Those skilled in the art will recognize that this is a standard model that has been shown to apply to many semiconductor lasers. Finally we assume that the receiver partially relies on a phase estimation algorithm that produces estimates $\phi$ that are the exact value of the carrier phase $\theta$ modulo $2\pi/N$ at the moment a reference symbol is received.

As may be appreciated, these would be the outputs of an ideal (except for sector uncertainty) estimation algorithm over intervals centered at the pilot reception times. We will index $\Psi$, $\psi$, $\theta$, $\Delta$ and $\phi$ with the number n of the reference symbol to which they apply. In particular $\Delta(n)=\theta(n)-\theta(n-1)$ and $\Psi(n)=\exp(j\theta(n))+$complex noise.

Note that because $\phi(n)=\theta(n)\mod 2\pi/N$, we can write $\theta(n)=\xi(n)+\phi(n)$ where $\xi(n)$ takes one of the values $0, 2\pi/N, 4\pi/N, \ldots, 2\pi(N-1)/N$ and the equality is modulo $2\pi$. The notation is simplified if we use s(n) to denote $\xi(n)+\phi(n)$. It takes one of the values in $\{\phi(n), \phi(n)+2\pi/N, \phi(n)+4\pi/N, \ldots, \phi(n)+2\pi(N-1)/N\}$, only one of which is equal to $\theta(n)$. So the task of the phase estimator can be seen to determine the sequence s(n) that best matches the unknown correct sequence $\theta(n)$. Note that this problem is one of making a decision about a sequence of a finite number of values, i.e. a decision problem, and not that of estimating a sequence of real numbers.

By using the statistics noted above, one can see that the conditional probability of the observations $\Psi$ and $\phi$ given an assumed sequence $\xi(n)$ or s(n) is proportional to:

$$\Pi_n \Sigma_k \exp(-(2\pi k+s(n)-s(n-1))^2/(2\mu^2)-((\Psi_r(n)-\cos(s(n)))^2+(\Psi_i(n)-\sin(s(n)))^2)/(2\sigma^2));$$

where the sum over k takes into account the wraparound of the phase noise $\Delta$.

For the relatively small phase noise variance of interest, this can be closely approximated by:

$$\Pi_n \exp(-\mathrm{mod}_{2\pi}(s(n)-s(n-1))^2/(2\mu^2)-((\Psi_r(n)-\cos(s(n)))^2+(\Psi_i(n)-\sin(s(n)))^2)/(2\sigma^2));$$

where $\mathrm{mod}_{2\pi}$ takes value in $[-\pi;\pi[$.

One way of making the decision is to apply the Maximum Likelihood method, which chooses the sequence s(n) that maximizes the product above, or equivalent that minimizes the sum $$\Sigma_n \mathrm{mod}_{2\pi}(s(n)-s(n-1))^2/(2\mu^2)-(\Psi_r(n)\cos(s(n))+\Psi_i(n)\sin(s(n)))/\sigma^2;$$

This is the "cost function" of the sequence s(n), which can be rewritten as:

$$\Sigma_n \kappa\, \mathrm{mod}_{2\pi}(s(n)-s(n-1))^2-(\Psi_r(n)\cos(s(n))+\Psi_i(n)\sin(s(n))) \text{ with } \kappa=0.5\mu^2/\mu^2$$

Advantageously, it turns out that this problem can be solved by using a generalized form of the Viterbi algorithm (originally to decode convolutional codes) where we construct a graph, called a trellis, where there are N nodes at time n. These N nodes are labeled with the possible values of s(n) (note that in this case these labels depend on the observation ϕ(n)) and where branches only exist between nodes adjacent in time.

FIG. 1 illustrates a trellis. In our case, the vertical dimension in the trellis represents the angle, which allows it to follow the phase fluctuations as a function of time in the figure. One observes that sequences s(n) and left to right paths traversing the trellis correspond to each other. Consequently the sum above can be interpreted as a "path length" which is a sum of branch lengths $\kappa \bmod_{2\lambda}(s(n)-s(n-1))^2$ and the node weights $-(\Psi_i(n)\sin(s(n))+\Psi_r(n)\cos(s(n)))$.

The Viterbi algorithm, or any shortest path algorithm, can be used to determine the shortest path length between arbitrary starting points and end points. That shortest path is the "decision path".

Note that $$\Psi_r(n)\cos(s(n)) + \Psi_i(n)\sin(s(n)) = |\Psi(n)|\cos(s(n) - \psi(n))$$

$$\sim 0.5 \ |\Psi(n)|\min(4, (s(n) - \psi(n))^2) + const$$

$$\sim 0.5 \ |\Psi(n)|(s(n) - \psi(n))^2 + const$$

$$\sim 0.5 \ (s(n) - \psi(n))^2 + const;$$

so various approximations can be also used for the node weights.

The sequence s(n) is the estimated phase at the reference symbol reception times. What is ultimately needed is an angle to rotate appropriately the phase of each data symbol to remove the influence of the phase noise. These angles can be obtained by interpolating between the phases estimates at neighboring reference symbol reception times. In addition one can also make use of additional phase estimates (with sector uncertainty) that are obtained over intervals centered between reference symbol reception times.

Even though we have derived a solution method by using the Maximum Likelihood decision principle in idealized conditions, the algorithm can be applied with good effect when the system exhibits more complicated statistics and when the estimates ϕ(n) are not necessarily equal to θ(n)mod 2π/N.

Through the branch length function it can use to advantage the fact that the laser phase is continuous, while through the node weights it can determine a good candidate for the absolute phase. The constant K can be optimized to fit local circumstances, for example by using a slow adjustment process based on dithering. The whole process can be carried with acceptable computational complexity. When the ϕ(n) are noisy some improvement may be obtained by combining with appropriate weights the estimated phase s(n) and ψ(n) before performing the interpolation.

To summarize, a overview of a method according to the present disclosure comprises:
constructing a trellis of N states at each time instant where a reference symbol is received, with node labels s(n) in the set {ϕ(n), ϕ(n)+2π/N, ϕ(n)+4π/N, . . . , ϕ(n)+2π(N−1)/N} where ϕ(n) is an arbitrary phase estimate, typically based on the data received around the reference symbol;
assigning branch lengths B(n, s, s') that depend of the labels of the nodes s(n)=s and s(n−1)=s' at each end of the branches;
assigning node weights W(n, s) that depend on the observed reference symbol Ψ(n) and on the node labels s(n)=s;
defining a path length as the sum of branch lengths and node weights of the branches and nodes on the path;
applying a shortest path algorithm to find the shortest path between arbitrary starting and end times;
The angles used for demodulation of the data symbols are obtained by interpolating between the label values of the neighboring reference symbols on the decision path. Those angles can sometimes be improved by weighting the labels on the decision path, the observed reference symbol angles ψ(n) and additional phase estimates (with sector uncertainty), where the weighting factors depend on the noisiness of the variables.

Specifically the known Viterbi algorithm iteratively assigns values $V(n, s)=\min_{s'}(V(n-1,s')+B(n,s, s'))+W(n,s)$ to the nodes with label s at time n and it records in a traceback array the label s' that achieves the minimum above. Note that at each time n a constant can be added to V(n,s) to keep its range finite, without affecting the value of said label s'. Typically the constant is chosen at time n to keep the smallest V(n,s) equal to 0.

When operating in real time, the Viterbi algorithm makes decision with a delay D. At time n it starts from the node s with minimum value V(n,s) and uses the traceback array to determine the best s at time n−D.

ILLUSTRATIVE EXAMPLES

In the cases illustrated below we assume N=4 and use a cost function $\kappa \bmod_{2\pi}(s(n)-s(n-1))^2-\Psi(n)|\cos(s(n)-\psi(n))$. We also assume that for n≤0 the phase variations Δ(n) are all close to 0 and the received reference symbols are close to their average, so that Ψ(n)~exp(jθ(n)). It follows from the equations for V(n,s) above, with V(n,s)=0 on the correct path, that V(n,s') will be $\sim\kappa(\pi/2)^2+1$ when s' differ from s by ±π/2 and that the traceback for those nodes will be to the correct path.

In the first case we assume that θ changes by π/2 between times 0 and 1 and then remains constant, and that the Ψ(n) for n>0 remain close to exp(jθ(n)). Note that the step change in θ is not reflected in ϕ, which is modulo π/2, so it will only be revealed by the Ψ(n). For $\kappa(\pi/2)^2>1$ and small n≥1 the path with smallest V(n,s) will be incorrect but it will accumulate a penalty of 1 per step due, to the node weights. After about $\kappa(\pi/2)^2$ steps the metric of the incorrect path will become larger than that of the correct path. If the traceback delay is larger than $\kappa(\pi/2)^2$ the decisions at the output of the Viterbi algorithm will be perfectly correct. However if Ψ(1) had a phase error of −π/2 (compared to θ(1)), there would be a decision error for n=1. Similarly if the traceback delay was shorter than $\kappa(\pi/2)^2$, decisions at a few times starting with n=1 would be incorrect.

In the second case we assume that the Δ(n) remain all small but that for 0<n<=D the Ψ(n) incur a steady phase error of π/2. As long as $D<\kappa(\pi/2)^2$, the correct path will maintain the smallest V(n,s). When $\kappa(\pi/2)^2<D<2\kappa(\pi/2)^2$ the incorrect path will have the smallest V(n,s) but the traceback of the correct path will remain on the correct path. When the Ψ(n) phase errors stop the correct path will regain the smallest V(n,s) and if the traceback delay is longer than $\kappa(\pi/2)^2$ no decision errors will be produced.

In the third case Δ(1)=π/4. At time n=1 the node on the correct path and the node with a label differing by −π/2 will have the same branch metrics and traceback to the correct path. Which of the correct and the incorrect path gains the smallest V(n,s) depends critically on the Ψ(n). The confusion is at its peak if Δ(D)=π/4 again for a small D, as the occurrence of an error is then completely determined by the few Ψ(n) between 1 and D−1.

Use with Dual Polarization Systems

Modern optical systems transmit signals on the two polarizations that can propagate through single mode fibers. A polarization equalizer in the receiver compensates for depolarization effects that typically occur during propagation. To recover the information, the signal phase must be recovered on both polarizations. Oftentimes, the transmitter and the receiver each use a single laser for both polarizations such that the phase noise is strongly correlated on both polarizations (although a slowly varying phase offset, which can be estimated, is typically present) and joint processing of the two polarizations is recommended. This can be done in at least two basic ways.

In a first way, one performs the phase recovery in parallel on each polarization, but the two instances of the algorithm are each based on measurements $\phi_k$ and $\Psi_k$ from both polarizations $\kappa \in \{1,2\}$. The $\phi_k$ and $\Psi_k$ can be combined with weights based on the observed correlation between the polarizations.

In a second way, the $\phi_k$, $k \in \{1,2\}$ and $\Psi_k k \in \{1,2\}$ are combined in an equal manner after phase offset compensation, and they are fed to a single instance of the phase recovery algorithm. This way is simpler but less able to track phase variations that may be polarization dependent, such as those due to non-linear propagation effects.

Performance Analysis

As the illustrations above have outlined, in general there is a correct path s(n) through the trellis as well as an output (decision) path s'(n). One expects that those two paths will overlap most of the time but there will also be segments when they diverge. Such an occurrence is called an "error event". Error events have been much studied in the context of convolutional codes. For an error event to happen, the cost function has to be smaller on the incorrect segment than on the correct segment.

The simplest analysis considers that $\phi(n)=\theta(n) \bmod 2\pi/N$. This is a best case scenario when $\phi$ is independent of $\theta(n)$ given $\theta(n) \bmod 2\pi/N$. We also assume that the statistics are as described in the idealized model outlined above and that the cost function has the form $\kappa \bmod_{2\pi}(s(n)-s(n-1))^2 - |\Psi(n)| \cos(s(n)-\psi(n))$, where $\kappa$ need not be equal to $0.5\sigma^2/\mu^2$.

We will ignore error events where $|\xi'(n)-\xi(n)|>2\pi/N$, assuming that $\psi(n)$ is very unlikely to give rise to them (this is confirmed by simulations). The remaining (and most likely) error events are thus those where the incorrect path diverges from the correct path by a constant $+2\pi/N$ (or $-2\pi/N$) during m reference symbols, and then merges again. Consequently the branch metrics will be the same on the correct and incorrect paths, except at the edges of an error event.

To simplify the notation we denote $\Psi(n)\exp(-js(n))$ by $\Psi''(n)$ and its angle by $\psi''(n)$. Note that $\Psi''(n)$ has unit mean. An error event with offset $+2\pi/N$ can start at time 1 and end at time m (That is, $s(0)=s'(0)$ and $s(m+1)=s'(m+1)$) only if:

$\kappa(\Delta(1)+2\pi/N)^2 - \Sigma_{i-1}{}^m |\Psi''(i)| \cos(\psi''(i)-2\pi/N) + \kappa(\Delta(m+1)-2\pi/N)^2 < \kappa\Delta(1)^2 - \Sigma_{i-1}{}^m|\Psi''(i)|\cos(\psi''(i)) + \kappa\Delta(m+1)^2$ or if $\kappa 4\pi(\Delta(m+1)-\Delta(1))/N - \Sigma_{i-1}{}^m|\Psi''(i)|(\cos(\psi''(i)-2\pi/N)-\cos(\psi''(i)))>2\kappa(2\pi/N)^{2\cdot}$ or if $\kappa 4\pi(\Delta(m+1)-\Delta(1))/N + \Sigma_{i-1}{}^m 2\sin(\pi/N)|\Psi''(i)|\sin(\psi''(i)-\pi/N)>2\kappa(2\pi/N)^{2\cdot}$ or if $\kappa 4\pi(\Delta(m+1)-\Delta(1))/N + \Sigma_{i-1}{}^m 2\sin(\pi/N)(\cos(\pi/N)\Psi_i''(i)-\sin(\pi/N)\Psi_r''(i))>2\kappa(2\pi/N)^2$ where $\Delta(1)$, $\Delta(m+1)$, $\Psi T_r''(i)$ and $\Psi_i''(i)$ are independent Gaussian random variables. The left hand side has variance $2(\kappa\mu 4\pi/N)^2 + 4m\sigma^2 \sin^2(\pi/N))$ and a mean $-2m \sin^2(\pi/N)$.

It follows that the error event has a probability bounded as follows:

$P(\text{error event}) \leq Q((2\kappa(2\pi/N)^2 + 2m \sin^2(\pi/N))./\sqrt(2(\kappa\mu 4\pi/N)^2 + m\sigma^2 4 \sin^2(\pi/N)));$ where Q( ) is the complementary Gaussian distribution function with zero mean and unit variance.

One can see that this is minimized for all m by $\kappa=0.5\sigma^2/\mu^2$. The expression then simplifies to:

$P(\text{error event}) \leq Q(\sqrt{2}(\pi/N)^2/\mu^2 + m \sin^2(\pi/N)/\sigma^2).$ The probability error event of length m with offset $-2\pi/N$ has the same upper bound. This probability is largest for m=1. Note that it decreases to 0 if one or both of the phase noise and additive noise variances are reduced.

If $\mu$ is very large then $\kappa$ is near zero and the algorithm relies only on the reference symbols. For m=1 the upper bound becomes:

$P(\text{error event}) \leq Q(\sin(\pi/N)/\sigma)$

This is the same expression as for the BPSK and QPSK data BER if data symbols have the same SNR as reference symbols.

We now discuss the case of QPSK at 30 Gigasymbols per second with 2% BER, implying $\sigma=0.344$. If we use a reference symbol density of 1/64 with 3 MHz linewidth, $\mu$ is 0.2. The probability of the union of the two error events of length 1 is then upper bounded by 3.2e−9 (per reference symbol) and it decreases by a factor of about 8.5 for each unit increment in m. If $\mu^2$ is decreased by a factor 2, either by reducing the linewidth or by increasing the pilot density, all bounds become lower than 1.e−15. If $\sigma^2$ is divided by a factor 2, either by sending and using consecutive reference symbols or by utilizing both the H and V reference symbols in a dual polarization system with perfectly correlated phases, the probability is reduced to 1.9e−10 for m=1 and it decreases by a factor of about 72 for each unit increment in m.

The analysis above also reveals that the typical errors events have $\Delta(1) \sim -\Delta(m+1) \sim \psi''(i) \sim \pm\pi/N$, which is the third case illustrated above.

Figure 2:
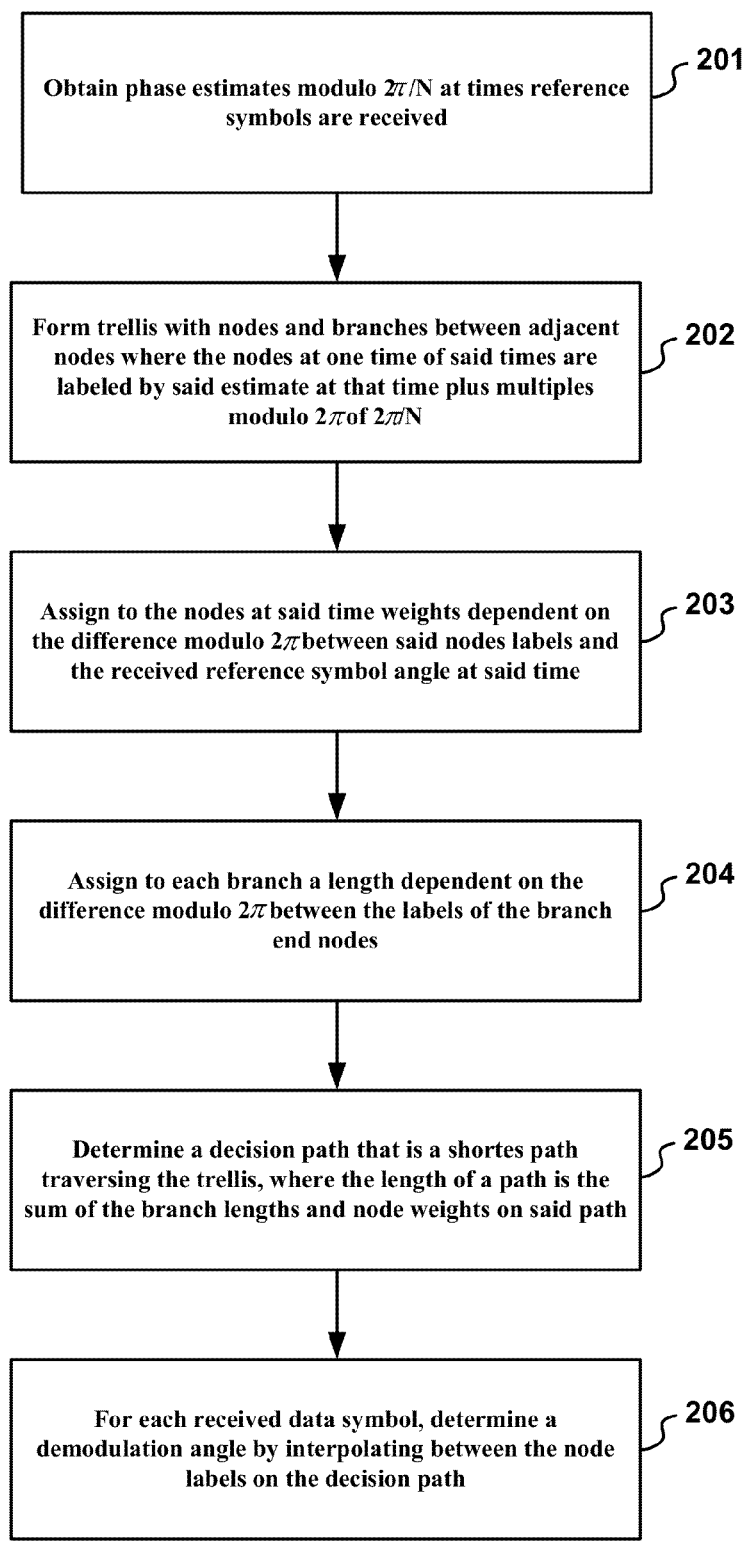
FIG. 2 shows a flow diagram depicting exemplary steps of a method according to an aspect of the present disclosure.

With these principles in place, we may now reference FIG. 2 which is a flow diagram depicting the overall steps of a method according to the present disclosure. As may be readily appreciated by those skilled in the art, such method may operate within a receiver of a coherent communications system that transmits modulated data symbols having N-ary symmetrical constellation and predetermined reference symbols. As depicted in FIG. 2, at block 201 the method first obtains a phase estimate modulo $2\pi/N$ at times the reference symbols are received. At block 202, a trellis is constructed with nodes and branches between adjacent nodes wherein the nodes at one time of said times are labeled by said estimate at that time plus distinct multiples modulo $2\pi$ of $2\pi/N$. At block 203, assigning to the nodes at said one time weights dependent on the difference modulo $2\pi$ between said nodes labels and received reference symbol angle at said time. At block 204, assigning to each branch a length dependent on the difference modulo $2\pi$ between the labels of the branch end nodes. At block 205, determining a decision path that is a shortest path traversing the trellis, where the length of a path is the sum of the branch lengths and node weights on said path. Finally at block 206, for each received data symbol, determining a demodulation angle by interpolating between the node labels on the decision path. Such demodulation angle may then be used/output to other communications functions as necessary. It is noted that exemplary embodiments may be performed on contemporary computing and/or data processing systems such as those shown in FIG. 3, or equivalent systems which may advantageously be part of an overall communications system or receiver component.

While the methods, systems, and apparatus according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A phase-slip reduction method for receivers in a coherent communication system transmitting predetermined reference symbols and non-differentially modulated data symbols exhibiting N-ary symmetry and requiring acquisition of absolute phase for demodulation comprising the steps of:
   a) obtaining a phase estimate modulo $2\pi/N$ of the non-differentially modulated signal at times the reference symbols are received;
   b) forming a trellis with nodes and branches between adjacent nodes wherein N nodes at one time of said times are labeled by absolute angles obtained by adding modulo $2\pi$ said estimate at that time plus distinct multiples of $2\pi/N$;
   c) assigning to the nodes at said one time, weights dependent on the difference modulo $2\pi$ between said nodes labels and received reference symbol angle at said time;
   d) assigning to each branch a length dependent on the difference modulo $2\pi$ between the labels of the branch end nodes;
   e) determining a decision path that is a shortest path traversing the trellis, where the length of a path is the sum of the branch lengths and node weights on said path; and
   f) for each received data symbol, determining an absolute demodulation angle by interpolating between the node labels on the decision path.

2. The phase-slip reduction method of claim 1 wherein said coherent communication system is a dual polarization system.

3. The phase slip reduction method of claim 2 wherein only one instance of the method is operating at a given time.

4. The phase slip reduction method of claim 2 wherein two instances of the method are operating at a given time.

5. A system for phase-slip reduction for receivers in a coherent communication system transmitting predetermined reference symbols and non-differentially modulated data symbols exhibiting N-ary symmetry and requiring acquisition of absolute phase for demodulation comprising a computing device including a processor and a memory coupled to said processor said memory having stored thereon computer executable instructions that upon execution by the processor cause the system to:
   a) obtain a phase estimate modulo $2\pi/N$ of the non-differentially modulated signal at times the reference symbols are received;
   b) form a trellis with nodes and branches between adjacent nodes wherein the N nodes at one time of said times are labeled by absolute angles obtained by adding modulo $2\pi$ said estimate at that time plus distinct multiples of $2\pi/N$;
   c) assign to the nodes at said one time weights dependent on the difference modulo $2\pi$ between said nodes labels and received reference symbol angle at said time;
   d) assign to each branch a length dependent on the difference modulo $2\pi$ between the labels of the branch end nodes;
   e) determine a decision path that is a shortest path traversing the trellis, where the length of a path is the sum of the branch lengths and node weights on said path; and
   f) for each received data symbol, determine an absolute demodulation angle by interpolating between the node labels on the decision path.

6. The phase-slip reduction system of claim 5 wherein said coherent communication system is a dual polarization system.

7. The phase slip reduction system of claim 6 wherein only one instance of the method is operating at a given time.

8. The phase slip reduction system of claim 6 wherein two instances of the method are operating at a given time.

9. A computer implemented method for phase-slip reduction for receivers in a coherent communication system transmitting predetermined reference symbols and non-differentially modulated data symbols exhibiting N-ary symmetry and requiring acquisition of absolute phase for demodulation comprising the steps of:
   a) obtaining a phase estimate modulo $2\pi/N$ of the non-differentially modulated signal at times the reference symbols are received;
   b) forming a trellis with nodes and branches between adjacent nodes wherein the N nodes at one time of said times are labeled by absolute angles obtained by adding modulo $2\pi$ said estimate at that time plus distinct multiples of $2\pi/N$;
   c) assigning to the nodes at said one time, weights dependent on the difference modulo $2\pi$ between said nodes labels and received reference symbol angle at said time;
   d) assigning to each branch a length dependent on the difference modulo $2\pi$ between the labels of the branch end nodes;
   e) determining a decision path that is a shortest path traversing the trellis, where the length of a path is the sum of the branch lengths and node weights on said path; and
   f) for each received data symbol, determining an absolute demodulation angle by interpolating between the node labels on the decision path.

10. The computer implemented phase-slip reduction method of claim 9 wherein said coherent communication system is a dual polarization system.

11. The computer implemented phase slip reduction method of claim 10 wherein one instance of the method is operating at a given time.

12. The computer implemented phase slip reduction method of claim 10 wherein two instances of the method are operating at a given time.

* * * * *